E. J. BALMOS.
STEERING ATTACHMENT FOR AUTOMOBILES.
APPLICATION FILED JAN. 17, 1918.
1,396,722.
Patented Nov. 15, 1921.
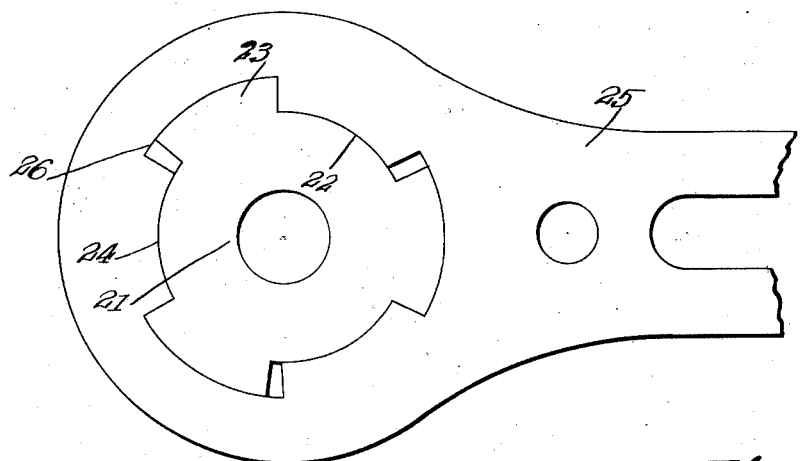
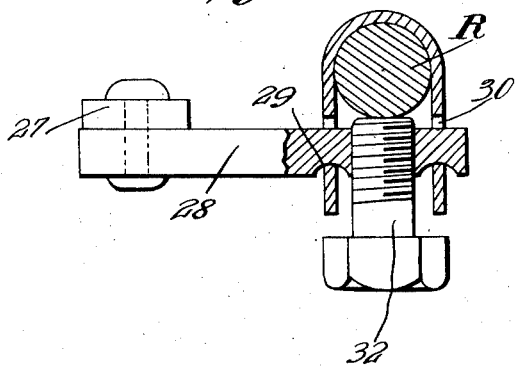
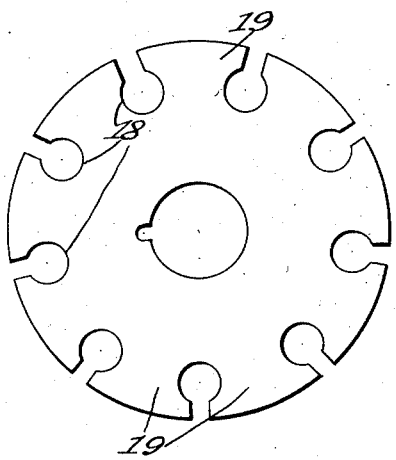

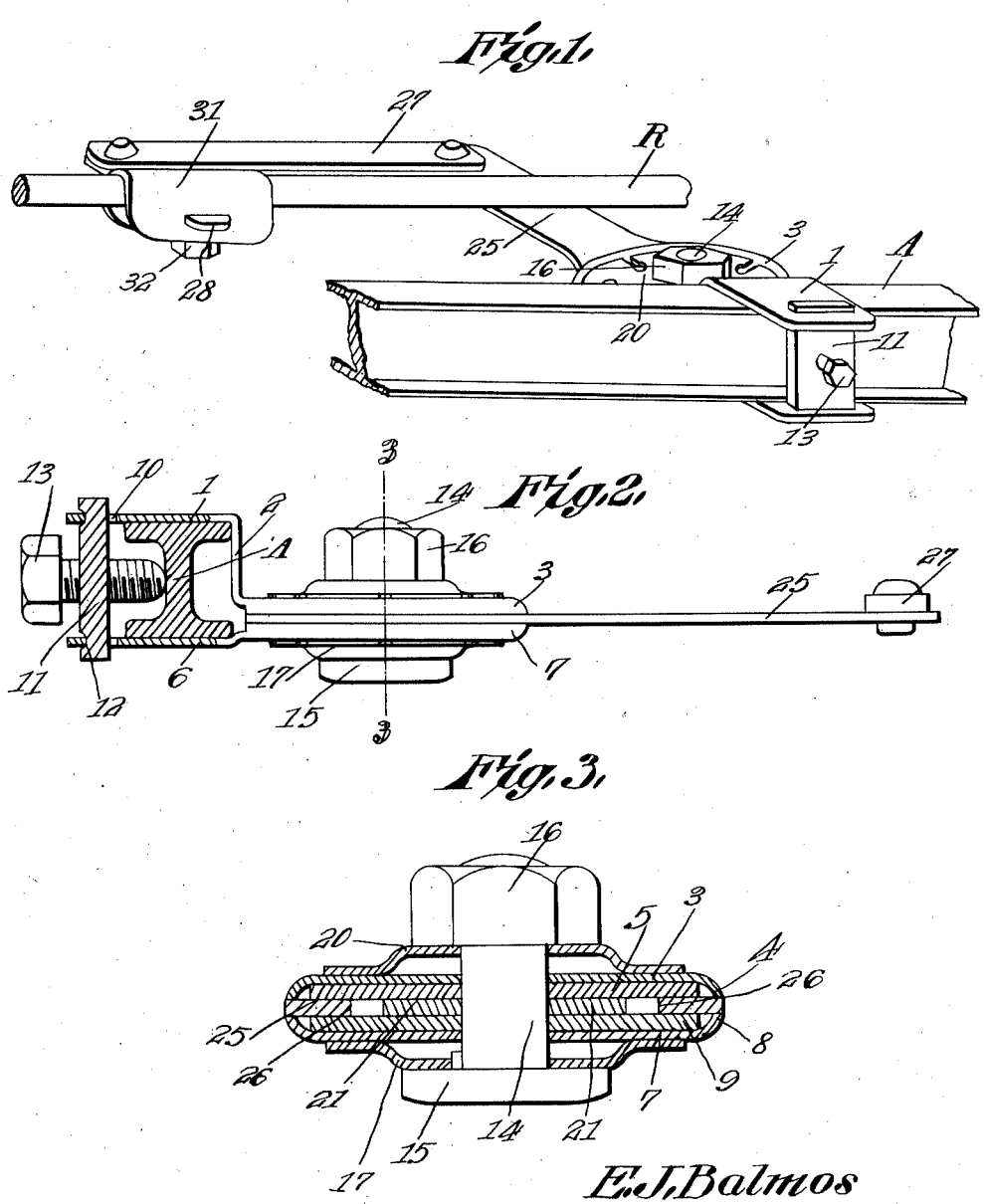

UNITED STATES PATENT OFFICE.

EDWARD J. BALMOS, OF DEVINE, TEXAS.

STEERING ATTACHMENT FOR AUTOMOBILES.

1,396,722.   Specification of Letters Patent.   Patented Nov. 15, 1921.

Application filed January 17, 1918. Serial No. 212,273.

*To all whom it may concern:*

Be it known that I, EDWARD J. BALMOS, a citizen of the United States, residing at Devine, in the county of Medina and State of Texas, have invented a new and useful Steering Attachment for Automobiles, of which the following is a specification.

This invention relates to a steering attachment for automobiles and is more especially designed for use in connection with the well known "Ford" automobiles, one of the objects of the invention being to provide means whereby the front wheels of the vehicle will be kept approximately in their course even though the hands of the driver are removed from the steering wheel.

A further object is to provide means for producing sufficient friction to retard the turning of the wheels out of their course by accident, the friction means being readily applied to the ordinary mechanism, being cheap to manufacture, and being efficient in use.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—

Figure 1 is a perspective view of a portion of the steering gear of a Ford automobile showing the present improvements combined therewith.

Fig. 2 is a view partly in side elevation and partly in section of the structure constituting the present invention and of adjacent parts.

Fig. 3 is an enlarged section on line 3—3 Fig. 2.

Fig. 4 is a plan view of the form of the attachment and the winged member therein.

Fig. 5 is a detail view of one of the spring disks employed.

Fig. 6 is an enlarged section through the connection provided for attaching the device to the steering rod of a Ford automobile.

Referring to the figures by characters of reference A designates a portion of an axle of a Ford automobile and R designates a portion of the steering rod. The present attachment is adapted to be applied to the axle and steering rod without necessitating any changes whatsoever in the construction and arrangement of the ordinary steering gear found upon the vehicle. The attachment includes an upper attaching plate 1 adapted to rest on the axle A and having a depending arm or hanger 2 from which extends a clamping disk 3. This disk has its peripheral portion turned downwardly as indicated at 4 thus to form a seat for a friction disk 5 which can be made of any desired material. Another attaching plate 6 is arranged under the axle A and has a disk 7 formed therewith or connected thereto, the peripheral portion of which is upturned as at 8 so as to form a seat or socket for a friction disk 9 similar to the disk 5.

The attaching plates 1 and 6 are provided with slots 10 and extending through these slots is a plate 11 having grooves 12 for the reception of certain of the walls of the slots. A binding screw 13 is extended through the plate 11 and bears against one face of the axle A. Thus it will be seen that by tightening the screw the plates 1 and 6 will be fastened securely to the axle.

Extending through the centers of the disks 3 and 7 and through the centers of the friction disks 5 and 9 is a bolt 14 having a head 15 at one end and having its other end threaded and engaged by a nut 16. Interposed between the head 15 and the disk 7 is a spring disk 17 which is cupped and has its peripheral portion flared outwardly and formed with substantially radial slots 18. As the disk is formed of spring material it will be apparent that those portions of the disk between the slots 16 will form springs 19. Another similar disk 20 is interposed between the nut 16 and the disk 3. Thus it will be seen that by tightening the nut 16 on the bolt 14 the spring disks 17 and 20 can be placed under tension.

Interposed between the disks 5 and 9 and mounted on the bolt 14 is a friction disk 21 having segmental recesses in its periphery as indicated at 22 and which recesses are separated by segmental wings 23. This disk 21 is mounted within an opening 24 formed within one end portion of an arm 25, there being segmental recesses 26 extending into the wall of the opening 24 and into which the wings 23 project. The length of each recess is slightly greater than the length of the segmental wing therein so that a limited rotation of the arm 25 relative to the disk 21 is permitted. The arm 25 has that portion thereof adjacent the opening 24 extended between the disks 5 and 9 and the peripheral portions of the disks 3 and 7. Arm 25 is extended to a point close to the rod R and has a link 27 pivotally connected to its free end. This link, in turn, is pivotally attached to a link 28 which is extended under the rod R and has spaced transverse notches 29. This link is extended through slots 30 formed in opposed portions of a U-shaped clip 31, the notches 29 being adapted to receive the lower walls of the slots 30. A binding screw 32 is extended through the link 28 and between the notches 29 and is adapted to bear tightly against the rod R, thus to securely bind the parts together and hold them against displacement relative to each other.

It will be apparent that by tightening the nut 16 the springs 17 and 20 will be placed under tension and the disks 5 and 9 will be caused to bind upon the disk 21 and a portion of the arm 25. Only a very small surface on the arm 25 engages the disks 5 and 9 and, consequently, the arm 25 is free to swing relative to the disk 21 with but slight resistance. Thus it will be seen that when the front wheels of the vehicle turn to the right or to the left for a slight distance the arm 25 will be free to move therewith. However, should the front wheels be moved to the right or left a distance sufficient to cause the arms 25 to rotate the disk 21, then all of the surface of each face of the disk 21 will be caused to rub on the adjacent disk 5 or 9 and a friction thus set up, in addition to that occurring between the arm 25 and the disks 5 and 9 will be sufficient to so retard the turning of the front wheels that an effort on the part of the driver will be necessary in order to effect this turning. Thus it will be seen that by attaching a device such as described to the steering mechanism of a Ford automobile, it will be possible for the driver to remove his hands entirely from the steering wheel without danger of the vehicle making an abrupt curve toward either side because of the lack of some restraining means.

What is claimed:—

A steering attachment for automobiles, comprising opposed clamping disks having their marginal portions turned toward each other to provide recessed inner faces, friction disks mounted between said clamping disks and surrounded by the marginal portions, dished spring disks mounted on the outer faces of the respective clamping disks and having spaced slots extending thereinto from their peripheries, forming segmental wings, a disk interposed between the friction disks and having segmental wings at its periphery separated by arcuate peripheral recesses, an arm clamped between the clamping disks and having an opening in which the interposed disk is mounted to rotate, there being segmental recesses in the wall of the opening for the reception of these segmental wings, said recesses being slightly longer than the wings to permit a limited relative movement of the arm and interposed disk, a bolt extending through all of the disks and keyed to one of the spring disks, means on the bolt for varying the tension of the spring disks and the frictional engagement between the parts, a link connected to the free end of the arm, means for detachably securing the link to the steering mechanism of a vehicle, and means for detachably securing the clamping disks to a vehicle axle.

In testimony that I claim the foregoing as my own, I have hereto affixed my signature in the presence of two witnesses.

EDWARD J. BALMOS.

Witnesses:
CHAS. W. ZIMMERMAN,
GEO. R. DAVIS.